(12) United States Patent
Yamada et al.

(10) Patent No.: US 11,009,368 B2
(45) Date of Patent: May 18, 2021

(54) ACTION SUPPORT DEVICE, ACTION SUPPORT METHOD, AND NON-TRANSITORY COMPUTER-READABLE STORAGE MEDIUM STORING PROGRAM

(71) Applicant: TOYOTA JIDOSHA KABUSHIKI KAISHA, Toyota (JP)

(72) Inventors: Takuji Yamada, Musashino (JP); Takeshi Fujiki, Tokyo (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 228 days.

(21) Appl. No.: 16/284,326

(22) Filed: Feb. 25, 2019

(65) Prior Publication Data

US 2019/0265065 A1     Aug. 29, 2019

(30) Foreign Application Priority Data

Feb. 27, 2018   (JP) .............................. JP2018-033777

(51) Int. Cl.
| | | |
|---|---|---|
| *G01C 21/36* | (2006.01) | |
| *G08G 1/01* | (2006.01) | |
| *G01C 21/34* | (2006.01) | |

(52) U.S. Cl.
CPC ..... *G01C 21/3691* (2013.01); *G01C 21/3484* (2013.01); *G01C 21/3492* (2013.01); *G08G 1/0141* (2013.01)

(58) Field of Classification Search
CPC .... G01C 21/36; G01C 21/34; G01C 21/3691; G01C 21/3484; G08G 1/00; G08G 1/01; G08G 1/0141; G08G 1/0967; B61L 27/00
See application file for complete search history.

(56) References Cited

U.S. PATENT DOCUMENTS

| | | | | |
|---|---|---|---|---|
| 5,982,298 A | * | 11/1999 | Lappenbusch ....... | G08G 1/0969 340/905 |
| 6,317,686 B1 | * | 11/2001 | Ran .................... | G01C 21/3691 701/117 |
| 6,356,839 B1 | * | 3/2002 | Monde ............... | G01C 21/3492 340/995.23 |

(Continued)

FOREIGN PATENT DOCUMENTS

| | | |
|---|---|---|
| EP | 3009324 A1 | 4/2016 |
| JP | 2012-014357 A | 1/2012 |

(Continued)

*Primary Examiner* — Tan Q Nguyen
(74) *Attorney, Agent, or Firm* — Oliff PLC

(57) ABSTRACT

An action support device includes a controller and a notification unit. The controller is configured to acquire action information of a user, the action information being extracted based on an action history of the user, and including a route having a start point and an end point, and a departure time at the start point, acquire traffic information, and determine whether or not a road obstacle or an operation obstacle indicated in the traffic information acquired before the departure time occurs on the route indicated in the action information. The notification unit is configured to, when the controller determines that the road obstacle or the operation obstacle indicated in the traffic information acquired before the departure time occurs on the route indicated in the action information, notify the user of information relating to the traffic information.

8 Claims, 2 Drawing Sheets

(56) References Cited

U.S. PATENT DOCUMENTS

| | | | | |
|---|---|---|---|---|
| 6,466,862 | B1* | 10/2002 | DeKock | G08G 1/0104 |
| | | | | 340/901 |
| 8,296,062 | B2* | 10/2012 | Yamane | H04L 67/18 |
| | | | | 701/432 |
| 10,222,223 | B2* | 3/2019 | Murata | G08G 1/0129 |
| 2004/0204845 | A1* | 10/2004 | Wong | G08G 1/096811 |
| | | | | 701/431 |
| 2004/0249568 | A1* | 12/2004 | Endo | G08G 1/096888 |
| | | | | 701/410 |
| 2005/0096842 | A1* | 5/2005 | Tashiro | G08G 1/096888 |
| | | | | 701/414 |
| 2007/0038362 | A1* | 2/2007 | Gueziec | G08G 1/096816 |
| | | | | 701/117 |
| 2011/0130852 | A1* | 6/2011 | Thorn | G06F 16/4387 |
| | | | | 700/94 |
| 2011/0238289 | A1* | 9/2011 | Lehmann | G01C 21/3617 |
| | | | | 701/533 |

FOREIGN PATENT DOCUMENTS

| | | |
|---|---|---|
| JP | 2016-186461 A | 10/2016 |
| WO | 2014/199503 A1 | 12/2014 |

* cited by examiner

ACTION SUPPORT DEVICE, ACTION SUPPORT METHOD, AND NON-TRANSITORY COMPUTER-READABLE STORAGE MEDIUM STORING PROGRAM

INCORPORATION BY REFERENCE

The disclosure of Japanese Patent Application No. 2018-033777 filed on Feb. 27, 2018 including the specification, drawings and abstract is incorporated herein by reference in its entirety.

BACKGROUND

1. Technical Field

The present disclosure relates to an action support device, an action support method, and a non-transitory computer-readable storage medium storing a program that notify of traffic information for supporting an action of a user.

2. Description of Related Art

Japanese Unexamined Patent Application Publication No. 2016-186461 (JP 2016-186461 A) discloses a facility guidance system that acquires information of a preference road conforming to a preference of a vehicle user based on a traveling history of a vehicle, when the vehicle user searches for a facility with a navigation device, searches for a route from a current place to the facility, and provides guidance to the facility to be headed through a route including many preference roads with priority.

SUMMARY

In JP 2016-186461 A, although the facility to be headed through the road conforming to the preference of the user when the user searches for the facility can be proposed, when the user does not search for the facility, it is not possible to provide the user with information. For example, it is desirable that it is possible to provide information for supporting an action schedule of the user.

The disclosure provides an action support device, an action support method, and a non-transitory computer-readable storage medium storing a program, having an advantage of supporting an action schedule of a user.

A first aspect of the disclosure relates to an action support device. The action support device includes a controller and a notification unit. The controller is configured to acquire action information of a user, the action information being extracted based on an action history of the user, and including a route having a start point and an end point, and a departure time at the start point, acquire traffic information, and determine whether or not a road obstacle or an operation obstacle indicated in the traffic information acquired before the departure time occurs on the route indicated in the action information. The notification unit is configured to, when the controller determines that the road obstacle or the operation obstacle indicated in the traffic information acquired before the departure time occurs on the route indicated in the action information, notify the user of information relating to the traffic information.

According to the first aspect of the disclosure, the user who recognizes the road obstacle or the operation obstacle notified before the departure time advances the departure time or changes the route, thereby coping with the road obstacle or the operation obstacle. In this way, the user is notified of information of the road obstacle or the operation obstacle occurred on the route of the action information of the user, whereby it is possible to support an action of the user. Furthermore, since the action information is extracted from the action history of the user, it is possible to automatically support the action of the user without causing the user to input the action information.

In the action support device according to the first aspect of the disclosure, the controller may be configured to, when positional information of the user indicates that the user is at a position of a predetermined distance from the start point of the action information, restrict the notification of the information relating to the traffic information to the user from the notification unit.

In the action support device according to the first aspect, the controller may be configured to, when positional information of the user indicates that the user is moving along the route of the action information, restrict the notification of the information relating to the traffic information to the user from the notification unit.

In the action support device according to the first aspect, the controller may be configured to extract habitual action information of the user based on a plurality of action histories of the user. The notification unit may be configured to, when the controller determines that the road obstacle or the operation obstacle occurs on a route indicated in the habitual action information before a departure time of the habitual action information, notify the user of the information relating to the traffic information.

In the action support device according to the aspect, the controller may be configured to extract a plurality of pieces of action information having the same route and the same time slot of the departure time out of the action information of the user within a predetermined period, and average the departure time of the pieces of action information to calculate the departure time of the habitual action information.

In the action support device according to the first aspect, the notification unit may be configured to, when the user is at the start point of the route in the action information, notify the user of the information relating to the traffic information.

In the action support device according to the first aspect, when the controller determines that the road obstacle or the operation obstacle occurs on the route indicated in the action information, and when the controller estimates that the user is later than an arrival time at the end point of the route, the notification unit may be configured to notify the user of the information relating to the traffic information. When the controller determines that the road obstacle or the operation obstacle occurs on the route indicated in the action information, and when the controller estimates that the user is not later than an arrival time at the end point of the route, the notification unit may be configured to restrict the notification of the information relating to the traffic information to the user.

A second aspect of the disclosure relates to an action support method. The action support method includes acquiring action information of a user, the action information being extracted based on positional information of a communication terminal of the user, and including a route having a start point and an end point, and a departure time at the start point; acquiring traffic information; and when a road obstacle or an operation obstacle indicated in the traffic information acquired before the departure time at the start point occurs on the route indicated in the action information, notifying the communication terminal of information relating to the traffic information.

According to the second aspect of the disclosure, the user who recognizes the road obstacle or the operation obstacle notified before the departure time advances the departure time or changes the route, thereby coping with the road obstacle or the operation obstacle.

A third aspect of the disclosure relates to a non-transitory computer-readable storage medium storing a program to be executed by a communication terminal of a user, the communication terminal being configured to acquire positional information. The program includes action information acquisition processing for acquiring action information of a user, the action information being extracted based on positional information of a communication terminal of the user, and including a route having a start point and an end point, and a departure time at the start point, traffic information acquisition processing for acquiring traffic information, and notification processing for, when a road obstacle or an operation obstacle indicated in the traffic information acquired before the departure time at the start point occurs on the route indicated in the action information, notifying of information relating to the traffic information.

According to the aspects of the disclosure, it is possible to provide a technique capable of supporting the action schedule of the user.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
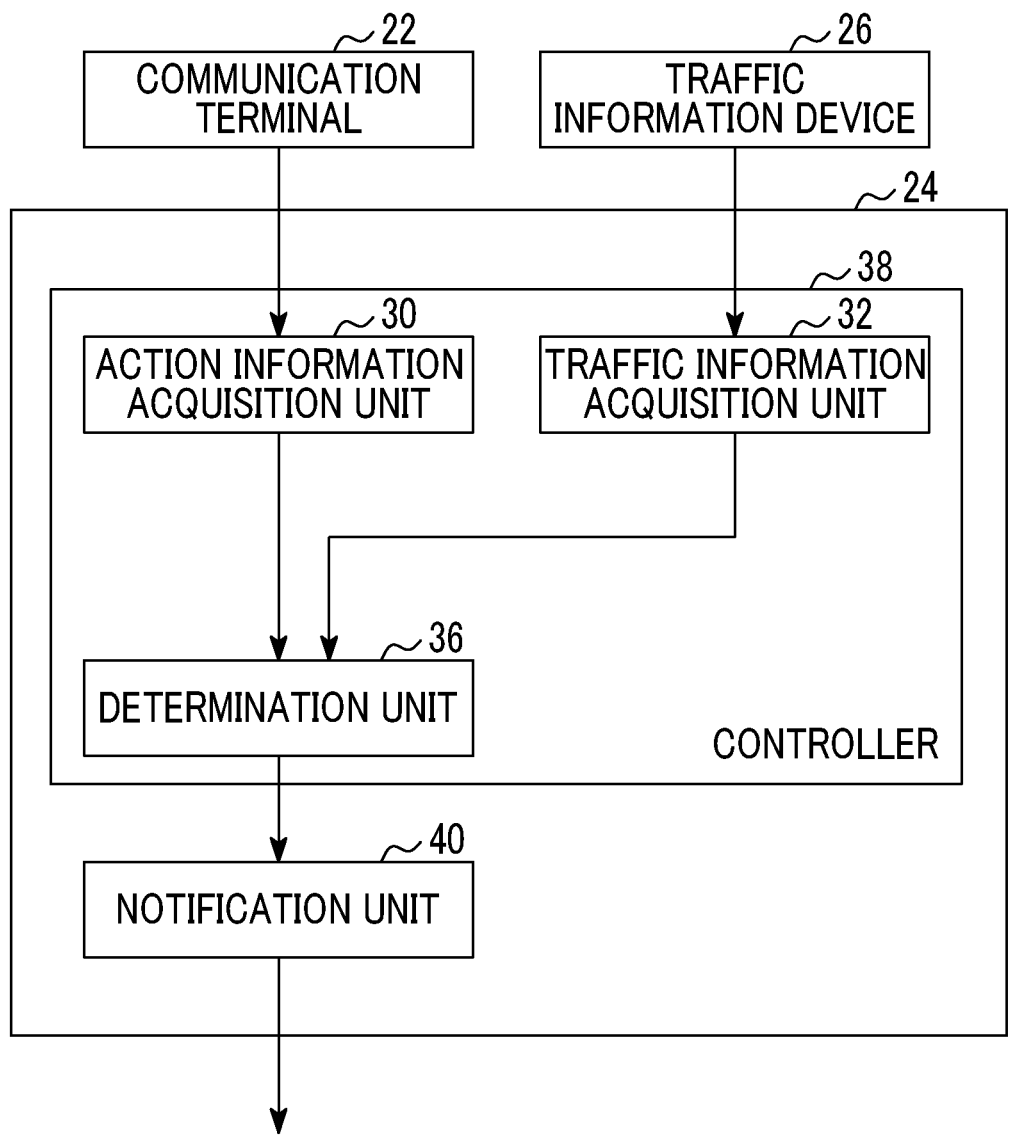
FIG. 1 is a diagram showing the functional configuration of an action support system of an example.

FIG. 1 is a diagram showing the functional configuration of an action support system 1 of an example. In FIG. 1, elements that are described as functional blocks for performing various kinds of processing can be constituted of a circuit block, a memory, and other large scale integrations (LSIs) in terms of hardware or are realized by a program or the like loaded in a memory (for example, a non-transitory computer-readable storage medium) in terms of software. Accordingly, it can be understood by those skilled in the art that the functional blocks can be realized in various forms by hardware solely, software solely, or a combination of hardware and software, and are not limited to either one.

The action support system 1 acquires an action history of a user and traffic information and supports an action of the user based on these kinds of information. The action support system 1 includes a communication terminal 22 and a server device 24, and the server device 24 functions as an action support device that executes action support processing.

A traffic information device 26 transmits traffic information by Vehicle Information Communication System (VICS) (Registered Trademark) to the server device 24. The traffic information to be provided from the traffic information device 26 includes information indicating a road obstacle, such as an accident on a road, traveling restriction, or congestion, and an operation obstacle of transportation means using a vehicle, such as a railway. The road obstacle includes positional information indicating where an obstacle occurs, time information indicating when the obstacle occurs, and information indicating the state of the obstacle, or the like. The traffic information includes positional information indicating where an obstacle occurs, time information indicating when the obstacle occurs, the presence or absence of vehicle traveling, and information indicating the state of the obstacle, or the like. Information indicating the state of the obstacle includes permission and prohibition of traveling, a scheduled restoration time, a delay time accompanied by an obstacle, and the like.

The communication terminal 22 transmits the positional information of the communication terminal 22, that is, the action history of the user to the server device 24. The communication terminal 22 moves with the user and acquires the positional information and the time using a global positioning system (GPS). The communication terminal 22 is at least one of a portable terminal or an in-vehicle terminal, and moves along with the user. The communication terminal 22 may transmit the positional information to the server device 24 each time the positional information is acquired, or may transmit the stored positional information to the server device 24.

The server device 24 includes an action information acquisition unit 30, a traffic information acquisition unit 32, a determination unit 36, and a notification unit 40. The server device 24 includes a controller 38, and the controller 38 executes the functions of the action information acquisition unit 30, the traffic information acquisition unit 32, and the determination unit 36. The action information acquisition unit 30 acquires the positional information of the user and the time from the communication terminal 22 and acquires action information of the user including a route having a start point and an end point extracted based on the action history of the user and a departure time of the start point. The action information of the user to be acquired will be described referring to FIG. 2.

Figure 2:
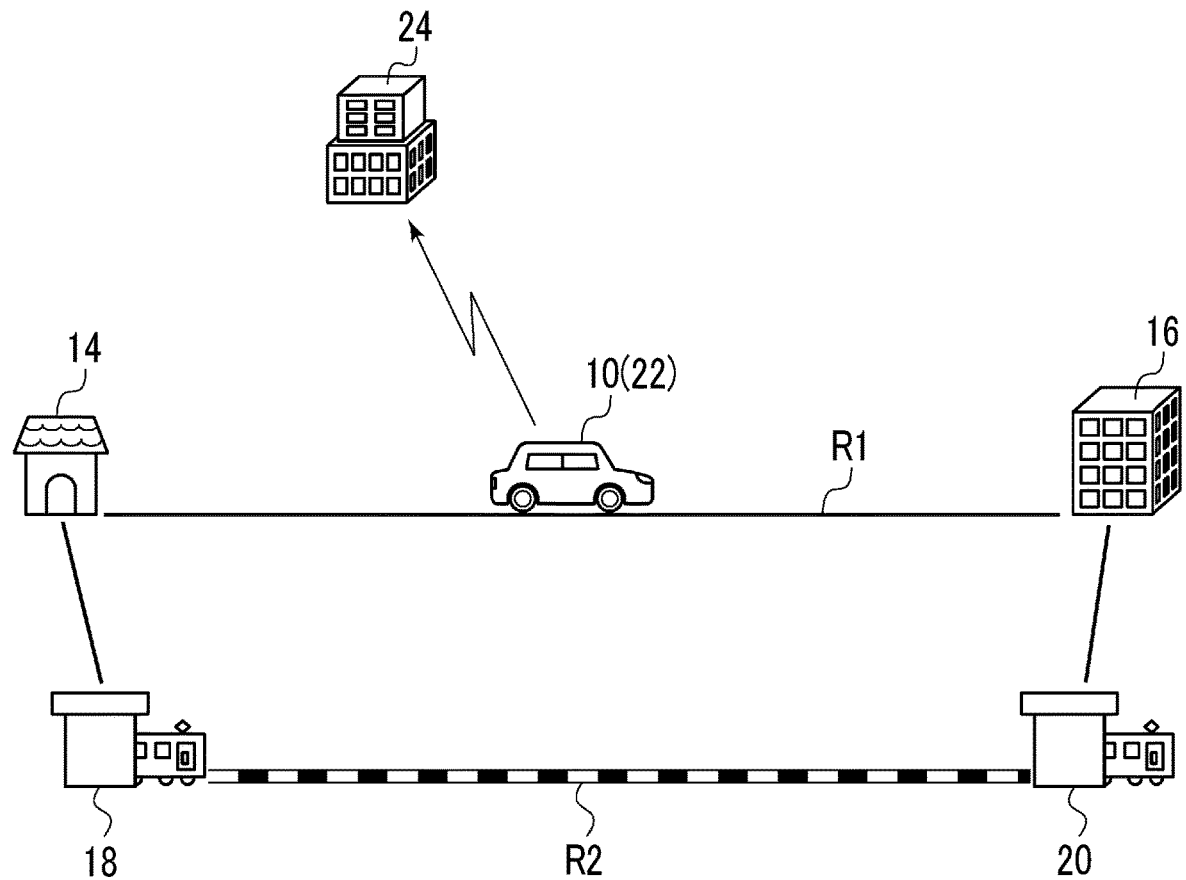
FIG. 2 is a diagram illustrating a system in which a server device acquires an action history of a user.

FIG. 2 is a diagram illustrating a system in which the server device 24 acquires the action history of the user. FIG. 2 shows a state in which the user is moving along a route R1 from a user's house 14 toward a user's workplace 16 using a vehicle 10. As a different route R2, the user moves from the user's house 14 toward a user's house nearest station 18 by walking, moves from the user's house nearest station 18 toward a user's workplace nearest station 20 by train, and moves from the user's workplace nearest station 20 toward the user's workplace 16 by walking.

The communication terminal 22 that moves along with the user transmits the positional information and the time to the server device 24 placed in a data center. The action information acquisition unit 30 of the server device 24 derives action information indicating a route, along which the user with the communication terminal 22 moves, based on the positional information of the communication terminal 22 and the time.

The action information acquisition unit 30 specifies a stay point where the communication terminal 22 stays within an area of a predetermined range for a predetermined time or more, from the positional information acquired in a time-series manner. The specified stay point constitutes the start point or the end point of the action information. The action information acquisition unit 30 specifies the stay point, decides a temporally adjacent stay point as the start point or the end point of the action information, extracts the action information of the user. A time of starting to move from the start point to the end point becomes a departure time.

The action information acquisition unit 30 may specify a type of transportation means based on a moving speed and a position and may include the type of the transportation means in the action information. For example, when the moving speed is equal to or higher than a predetermined speed and the communication terminal 22 is moving along a route, the action information acquisition unit 30 specifies that the transportation means of the user is a railway, and when the moving speed is equal to or higher than the predetermined speed and the communication terminal 22 is moving through a road, the action information acquisition unit 30 specifies that the transportation means of the user is a vehicle, such as an automobile or a bus. The departure time of the action information may also include day-of-the-week information, and the action information may include weather information at the time when the communication terminal 22 is moving.

The action information acquisition unit 30 extracts habitual action information of the user based on a plurality of action histories of the user. That is, the action information acquisition unit 30 extracts an action to be repeated multiple times in the action information of the user and extracts action information on a lifestyle habit. The action information acquisition unit 30 extracts habitual action information, for example, action information of attendance or leaving, action information to a training facility to be attended on a holiday, or the like.

The action information acquisition unit 30 extracts action information having the same route and time slot of the departure time in the action information for a week and decides a departure time obtained by averaging the departure times of a plurality of pieces of extracted action information as a departure time of a habitual action. The route and the departure time of the habitual action are defined by the action information acquisition unit 30. The action information acquisition unit 30 extracts action information having the same route and time slot of the departure time or an arrival time and decides an arrival time obtained by averaging the arrival times of a plurality of pieces of extracted action information, as an arrival time at the end point of the route indicated in the habitual action.

The habitual action to be extracted by the action information acquisition unit 30 may include not only the route and the departure time, but also day-of-the-week information or weather information, and different habitual actions may be defined depending on the day of the week, or different habitual actions may be defined depending on a difference in weather.

The action information acquisition unit 30 may extract a habitual action based on the action information of the user within a predetermined period and may discard the past action information of the user before the predetermined period or more to update the habitual action of the user. The extracted habitual action information of the user is stored by the server device 24 in association with at least one of an ID or a user ID of the communication terminal 22 and is managed for each user.

The action information acquisition unit 30 may transmit the extracted habitual action information to the communication terminal 22, and the communication terminal 22 may display the received habitual action information to inform the user of the habitual action information. The communication terminal 22 displays the extracted habitual action information and displays an item for deleting the extracted habitual action information. When the user selects the item for deleting the habitual action information, the habitual action information is discarded. With this, it is possible to allow the user to confirm whether or not an extraction result of the action information acquisition unit 30 is appropriate.

Returning to FIG. 1, the traffic information acquisition unit 32 acquires the traffic information from the traffic information device 26. The traffic information includes the positional information of the road obstacle or the operation obstacle and the time information.

The determination unit 36 determines whether or not the road obstacle or the operation obstacle indicated in the traffic information acquired by the traffic information acquisition unit 32 before the departure time occurs on the route indicated in the habitual action information. Determination processing of the determination unit 36 will be described referring to FIG. 3.

Figure 3:
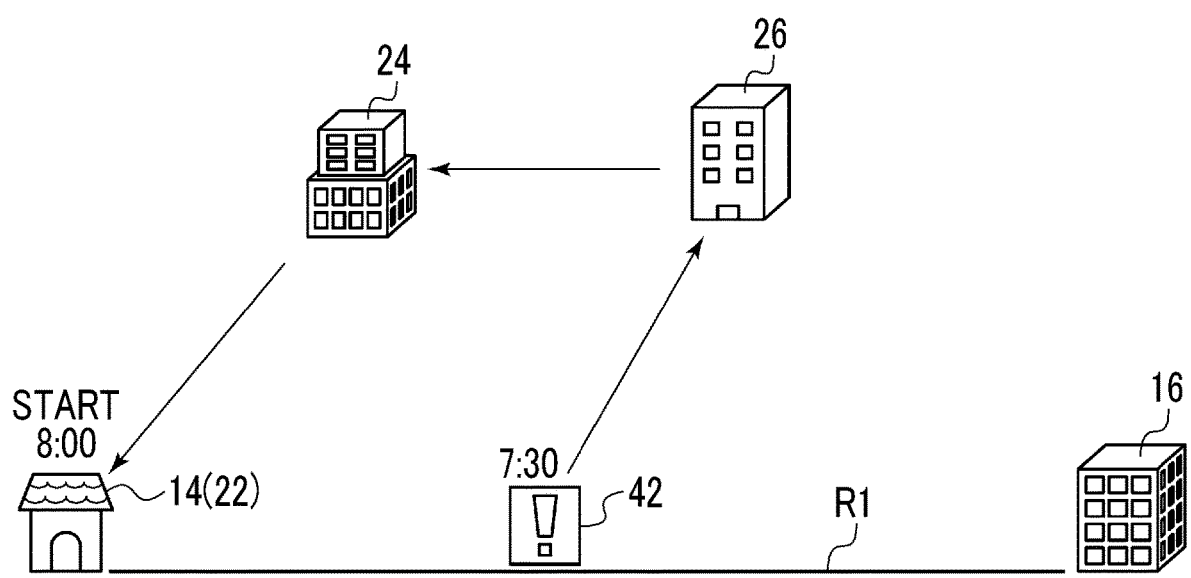
FIG. 3 is a diagram illustrating processing for determining whether or not a road obstacle occurs on a route indicated in action information of the user.

FIG. 3 is a diagram illustrating processing for determining whether or not a road obstacle occurs on a route indicated in the action information of the user. The action information acquisition unit 30 extracts habitual action information relating to movement along the route R1 from the user's house 14 to the user's workplace 16 at the departure time of eight o'clock in the morning.

The traffic information device 26 provided in an information center acquires traffic information of an occurred road obstacle 42, and the traffic information acquisition unit 32 of the server device 24 acquires the traffic information of the road obstacle 42 from the traffic information device 26. The traffic information acquisition unit 32 acquires the latest traffic information for every determination processing of the determination unit 36 and sends the traffic information to the determination unit 36.

The determination unit 36 determines whether or not a road obstacle or an operation obstacle occurs on the route R1 at every predetermined interval before the departure time by a predetermined time. For example, the determination unit 36 starts the determination processing from seven o'clock in the morning before the departure time by one hour, and then, executes the determination processing at an interval of 10 minutes. In this way, the departure time defined in the habitual action information is used to decide a timing of starting the determination processing of the determination unit 36. The determination unit 36 receives positional information of the road obstacle 42 at 7:30 in the morning and determines that the road obstacle 42 occurs on the route R1. The determination unit 36 sends a determination result to the notification unit 40.

When the road obstacle or the operation obstacle indicated in the traffic information before the departure time occurs on the route indicated in the action information, the notification unit 40 notifies the user of information relating to the traffic information. The notification unit 40 transmits, to the communication terminal 22, information indicating that the road obstacle 42 occurs on the route R1, and notifies the user of information of the road obstacle 42 from the communication terminal 22. The notification unit 40 may not give notification when the road obstacle 42 does not occur on the route R1.

The communication terminal 22 makes notification sound and displays information of the road obstacle 42 received from the notification unit 40 to notify the user of information of the road obstacle 42. The user views the notification, ascertains the road obstacle 42 on the route R1, and attends along the route R2 using a train while avoiding the route R1 or advances the departure time, thereby coping with the road obstacle 42. Even though the user does not register a schedule, a route, or the like in the communication terminal 22, it is possible to notify of information of a traffic obstacle that occurs in the habitual action of the user.

When the positional information of the user indicates that the user is at a position of a predetermined distance from the start point of the habitual action information, the notification unit 40 restricts the notification of information relating to the traffic information to the user. That is, when the user is at a position away from the start point of the habitual action information, since the user does not perform an action following the habitual action information, the notification unit 40 restricts the notification. When the user is at the start point of the habitual action information, the notification unit 40 notifies of information relating to the traffic information. In this way, when it is specified that the user does not take the habitual action information from the positional information of the user, it is possible to suppress unneeded notification to the user. The positional information of the user can be acquired from the positional information of the communication terminal 22, in particular, positional information of a portable terminal. The predetermined distance may be, for example, 500 meters to several kilometers, or may be set depending on the length of the route in the habitual action information of the user.

When the positional information of the user indicates that the user is moving along the route of the action information, the notification unit 40 restricts the notification of information relating to the traffic information to the user. When the user already starts to move, since the departure time cannot be advanced and the route is hardly changed, the notification to the user is suppressed.

Even when a traffic obstacle occurs on a route of a habitual action, the notification unit 40 restricts notification when the user is estimated to be not later than an arrival time of the habitual action, and notifies the user of information relating to the traffic information when the user is estimated to be later than the arrival time of the habitual action information. The notification unit 40 determines whether or not the user is later than the arrival time of the habitual action information, using a delay time due to an obstacle included in the acquired traffic information and the arrival time of the habitual action information. With this, when the user puts into congestion in rush hours occurring every day and takes a habitual action, notification of congestion information occurring every day is suppressed.

In the example, although an aspect in which the server device 24 executes the action support processing as the action support device has been described, the disclosure is not limited to the aspect, and the action support processing may be executed in the communication terminal 22, or a part of the action support processing may be executed in the communication terminal 22. For example, the communication terminal 22 may have an application program that executes all of the functions of the action information acquisition unit 30, the traffic information acquisition unit 32, the determination unit 36, and the notification unit 40. The server device 24 may execute the function of the action information acquisition unit 30, and the communication terminal 22 may execute the functions of the traffic information acquisition unit 32, the determination unit 36, and the notification unit 40. The processing for extracting the habitual action information in the action information acquisition unit 30 may be executed in a server device different from the server device 24, and the server device 24 may execute the habitual action information and may execute the functions of the traffic information acquisition unit 32, the determination unit 36, and the notification unit 40.

The example is just for illustration, and it can be understood by those skilled in the art that various modification examples to a combination of the constituent elements may be made and such modification examples also fall within the scope of the disclosure.

In the example, although an aspect in which the action information is extracted from the positional information of the user has been described, the disclosure is not limited to the aspect. For example, the user may input action information to the communication terminal 22, and when a road obstacle or an operation obstacle occurs on a route indicated in the input action information, the communication terminal 22 may notify the user of concerned traffic information.

What is claimed is:

1. An action support device comprising:
   a controller configured to
      acquire action information of a user, the action information being extracted based on an action history of the user, and including a route having a start point and an end point, and a departure time at the start point,
      acquire traffic information, and
      determine whether or not a road obstacle or an operation obstacle indicated in the traffic information acquired before the departure time occurs on the route indicated in the action information; and
   a notification unit configured to, when the controller determines that the road obstacle or the operation obstacle indicated in the traffic information acquired before the departure time occurs on the route indicated in the action information, notify the user of information relating to the traffic information,
   wherein the controller is configured to, when positional information of the user indicates that the user is at a position of a predetermined distance or more away from the start point of the action information, restrict the notification of the information relating to the traffic information to the user from the notification unit.

2. The action support device according to claim 1, wherein the controller is configured to, when positional information of the user indicates that the user is moving along the route of the action information, restrict the notification of the information relating to the traffic information to the user from the notification unit.

3. The action support device according to claim 1, wherein:
   the controller is configured to extract habitual action information of the user based on a plurality of action histories of the user; and
   the notification unit is configured to, when the controller determines that the road obstacle or the operation obstacle occurs on a route indicated in the habitual action information before a departure time of the habitual action information, notify the user of the information relating to the traffic information.

4. The action support device according to claim 3, wherein the controller is configured to
   extract a plurality of pieces of action information having the same route and the same time slot of the departure time out of the action information of the user within a predetermined period, and
   average the departure time of the pieces of action information to calculate the departure time of the habitual action information.

5. The action support device according to claim 3, wherein:
   when the controller determines that the road obstacle or the operation obstacle occurs on the route indicated in the action information, and when the notification unit estimates that the user is later than an arrival time at the end point of the route indicated in the habitual action information, the notification unit is configured to notify the user of the information relating to the traffic information; and when the controller determines that the road obstacle or the operation obstacle occurs on the route indicated in the action information, and when the notification unit estimates that the user is not later than an arrival time at the end point of the route, the notification unit is configured to restrict the notification of the information relating to the traffic information to the user.

6. The action support device according to claim 1, wherein the notification unit is configured to, when the user is at the start point of the route in the action information, notify the user of the information relating to the traffic information.

7. An action support method comprising:
acquiring action information of a user, the action information being extracted based on positional information of a communication terminal of the user, and including a route having a start point and an end point, and a departure time at the start point;
acquiring traffic information;
when a road obstacle or an operation obstacle indicated in the traffic information acquired before the departure time at the start point occurs on the route indicated in the action information, notifying the communication terminal of information relating to the traffic information; and
when the positional information of the communication terminal of the user indicates that the user is at a position of a predetermined distance or more away from the start point of the action information, restrict the notifying the communication terminal of the information relating to the traffic information.

8. A non-transitory computer-readable storage medium storing a program to be executed by a communication terminal of a user, the communication terminal being configured to acquire positional information, the program comprising:
action information acquisition processing for acquiring action information of a user, the action information being extracted based on positional information of a communication terminal of the user, and including a route having a start point and an end point, and a departure time at the start point;
traffic information acquisition processing for acquiring traffic information;
notification processing for, when a road obstacle or an operation obstacle indicated in the traffic information acquired before the departure time at the start point occurs on the route indicated in the action information, notifying of information relating to the traffic information; and
restricting the notification processing for notifying of the information relating to the traffic information when the positional information of the communication terminal of the user indicates that the user is at a position of a predetermined distance or more away from the start point of the action information.

* * * * *